(12) United States Patent
Okayama

(10) Patent No.: US 6,507,690 B1
(45) Date of Patent: Jan. 14, 2003

(54) OPTICAL DEVICE

(75) Inventor: Hideaki Okayama, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 251 days.

(21) Appl. No.: 09/667,698

(22) Filed: Sep. 22, 2000

(30) Foreign Application Priority Data

Sep. 22, 1999 (JP) .......................................... 11-269201

(51) Int. Cl.[7] .................................................. G02B 6/10
(52) U.S. Cl. .............................. 385/129; 385/31; 385/33
(58) Field of Search ................................ 385/129–132, 385/31–34

(56) References Cited

U.S. PATENT DOCUMENTS

| | | | | |
|---|---|---|---|---|
| 4,859,033 A | * | 8/1989 | Kono et al. ................. | 385/320 |
| 4,963,143 A | * | 10/1990 | Pinnow ........................ | 604/14 |
| 6,236,784 B1 | * | 5/2001 | Ido .............................. | 385/45 |
| 6,259,717 B1 | * | 7/2001 | Stone et al. ............. | 385/146 X |
| 6,327,408 B1 | * | 12/2001 | Hiller ........................... | 385/49 |

OTHER PUBLICATIONS

Pennings et al., Ultracompact Multimode Interference Waveguide Devices, 1993, pp. 193–194 (Not Print).

* cited by examiner

Primary Examiner—Lynn Field
Assistant Examiner—Son V. Nguyen
(74) Attorney, Agent, or Firm—Wenderoth, Lind & Ponack, L.L.P.

(57) ABSTRACT

A disclosed optical device comprises: at least one input waveguide path; a multi-mode waveguide path; a core layer having a plurality of output waveguide paths; and a clad layer having therein the core layer. The multi-mode waveguide path is formed in an island. In a region including the multi-mode waveguide path and a portion of the clad layer which has therein the multi-mode waveguide path along the propagation direction of a concerned optical axis, an average value of the refractive index along the propagation direction is set at a desired value.

11 Claims, 8 Drawing Sheets

OPTICAL DEVICE

BACKGROUND OF THE INVENTION

1. Field of the Invention

The present invention relates to an optical device, and more particularly, it relates to an optical device provided with a multi-mode waveguide path.

2. Description of the Related Art

There has conventionally been provided an optical coupler in the field of optical communication. An optical coupler refers to a device for branching one signal into an N (N is 2 or a larger integer) number of ports for output. Such an optical coupler may be equipped with a multi-mode waveguide path, to provide a certain type of optical coupler (hereinafter called multi-mode waveguide type optical coupler). An example of a configuration of this multi-mode type optical coupler is disclosed in the literature (IEEE Laser and Electro-optics Society (LEOS), 1983, pp. 193–194), which is hereinafter referred to as a first coupler.

The following will describe the configuration of a prior-art first coupler 100 with reference to FIG. 8. FIG. 8 is a plan view of the first coupler 100 as viewed from the upper side of the main surface of a clad layer. Actually, however, since a waveguide path (i.e., core) 102 is covered by a clad layer 104 and a substrate (not shown in FIG. 8), the waveguide path 102 cannot directly be seen from the upper side of the main surface of the clad layer 104, but to spotlight the shape of the waveguide path 102, FIG. 8 shows the shape of the waveguide path 102 (hatched portion) on this main surface. This waveguide path 102 comprises two input waveguide paths 106A and 106B, a multi-mode waveguide path 108, and three output waveguide paths 110A through 110C. In this case, however, the waveguide path 102 is supposed to have a uniform (constant) refractive index. Furthermore, the input waveguide paths 106A and 106B and the output waveguide paths 110A–110C are each supposed to be a single-mode waveguide path, although they may be a multi-mode one. The multi-mode waveguide path 108 has a rectangular shape as viewed from the upper side of the main surface of the clad layer 104. The major axis direction of this rectangle agrees with a direction in which the light propagate.

Next, the propagation form of an optical signal in the first coupler 100 is described below. This example is explained with reference to a case where a predetermined single-wavelength optical signal is input from outside to the input waveguide path 106A, i.e., the input waveguide path 106B is not used. This optical signal propagates through the input waveguide path in the single mode and then enters the multi-mode waveguide path 108. This optical signal enters the multi-mode. This optical signal in the multi-mode propagates through this multi-mode waveguide path 108, to subsequently enter all (or either one) of the output waveguide paths 110A–110C. The optical signals thus propagating through the respective output waveguide paths 110A–110C enter the single mode again. Note here that the power ratio (hereinafter called coupling ratio) of these optical signals coupled to the output waveguide paths 110A–110C is determined beforehand based on the configuration of this first coupler 100.

According to the configuration of the first coupler 100, however, since the refractive index of the multi-mode waveguide path 108 is constant, the coupling ratio is limited within a certain range and therefore cannot always be set at a desired value, which leads to a problem.

According to the configuration of the first coupler 100, however, since the refractive index of the multi-mode waveguide path 108 is constant, the coupling ratio is limited within a certain range and so cannot always be set at a desired value, which leads to a problem.

To guard against this, there is provided such an optical coupler that can change its refractive index in the multi-mode waveguide path to control the mode-field distribution of an optical signal in the multi-mode waveguide path, thus obtaining a desired coupling ratio. FIG. 9 is a plan view as viewed from the upper side of the main surface of a clad layer of a second prior-art coupler. A multi-mode waveguide path 202 comprises a high refractive index region 202A, a middle refractive index region 202B, and a low refractive index region 202C. These regions 202A–202C are partitioned off from each other by a boundary line running parallel to the relevant major axis. The high refractive index region 202A lies at the middle portion of the multi-mode waveguide path 202 and in the middle refractive index region 202B. The middle refractive index region 202B, on the other hand, is enclosed by the low refractive index 202C. FIG. 10 is a graph indicating a refractive index of the second coupler. In the figure, the vertical axis and the horizontal axis represent the refractive index and the position on a cross section X-Y of the multi-mode waveguide path 202 (i.e., plane in a direction of the minor axis of the multi-mode waveguide path 202). This curve of refractive index provides a step-shaped curve axis-symmetrical about a center-line QL running along the major axis of the multi-mode waveguide path 202. Based on this distribution of the refractive index, the propagation direction of an optical signal can be controlled in the multi-mode waveguide path 202, thus obtaining a desired coupling ratio.

To obtain such a refractive index distribution of the multi-mode waveguide path 202, an impurity corresponding to each refractive index value must be diffused into the core layer of this multi-mode waveguide path 202. Therefore, problematically, the production efficiency of the second coupler is reduced below that of the first coupler 100 by as much as an increase of the number of processes for that impurity diffusion.

To guard against this, there has been a need for such an optical device that can provide a desired coupling ratio and, at the same time, can be manufactured easily.

SUMMARY OF THE INVENTION

To achieve the above-mentioned object, a multi-mode waveguide path according to the present invention is formed in the shape of an island. With this, the average value of the refractive index along a propagation direction of an optical signal in a region including this multi-mode waveguide path and a clad layer having therein this multi-mode waveguide path along this propagation direction is set as a desired value. For example, preferably, the multi-mode waveguide path consists of a plurality of waveguide paths (called convex-lens type waveguide path) having a cross sectional shape of a convex lens which is projected onto the main surface as viewed from the upper side the main surface side of the clad layer, which convex-lens-type waveguide paths are preferably arranged parallel to each other with an equivalent spacing therebetween along the propagation direction. Preferably, each of these convex-lens type waveguide paths is the same in shape and size. More preferably, the shape of these convex-lens type waveguide paths is both-side convex lens type.

According to such a configuration, the multi-mode waveguide path is formed island-shaped, thus making it possible to obtain a desired coupling ratio. Furthermore, this type of an optical device can be manufactured easily because it does not require the process of multi-step diffusing an impurity in contrast to the conventional construction.

DESCRIPTION OF THE PREFERRED EMBODIMENTS

Figure 1:
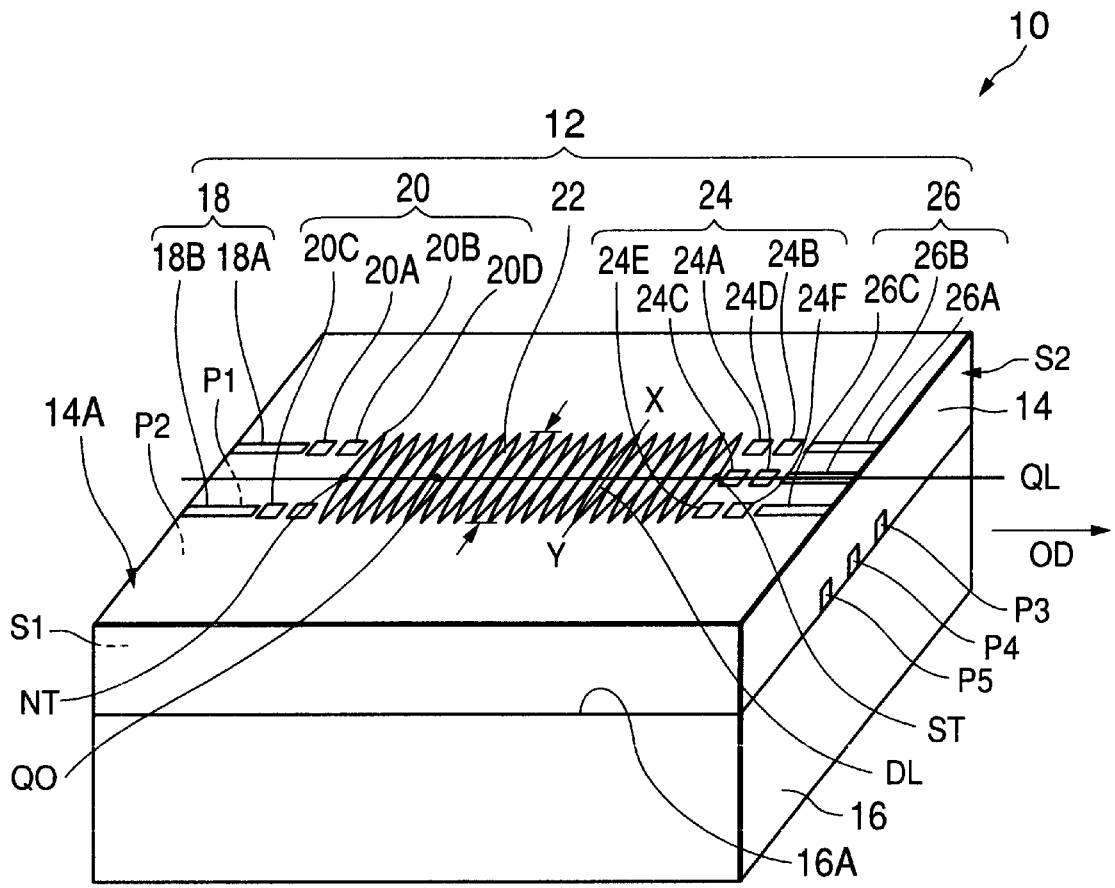
FIG. 1 is a perspective view of an embodiment of an optical coupler of the present invention.

The following will describe embodiments of the present invention with reference to the drawings. In the drawings, the size, the shape, and the mutual relationship in arrangement of each component are just roughly shown for the understanding of the present invention, so that the present invention is not limited to the exemplified embodiments.

Figure 2:
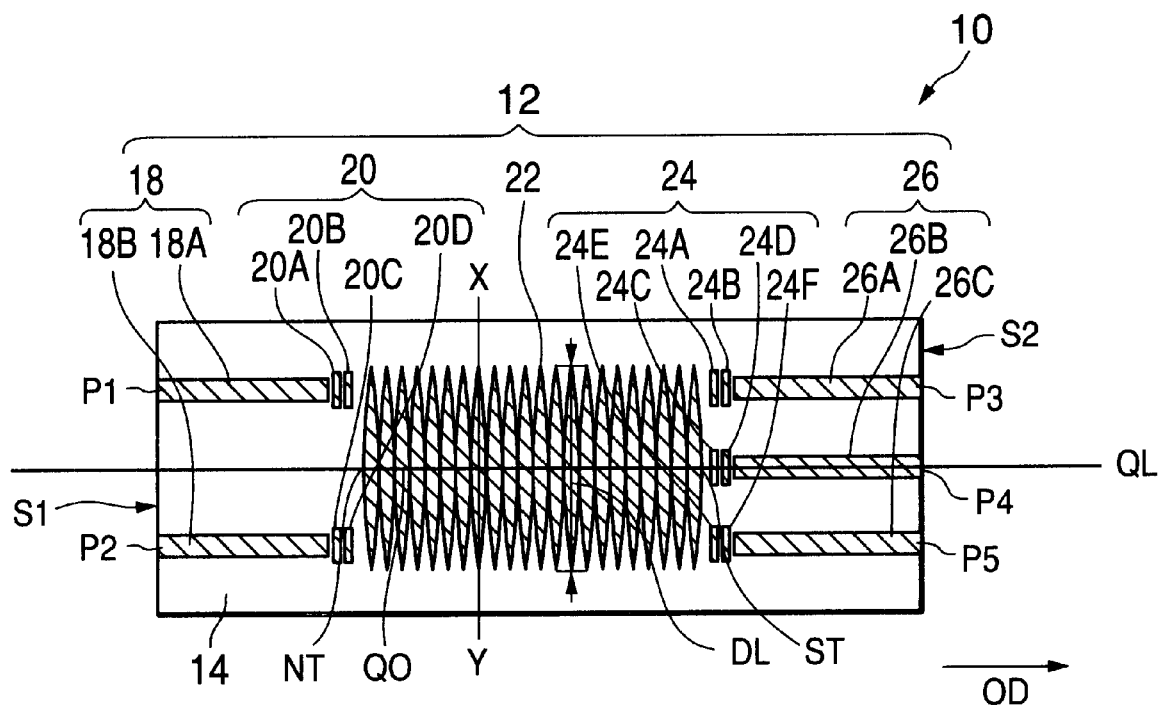
FIG. 2 is a plan view of the embodiment of the present invention.

First, with reference to FIGS. 1 and 2, an overall configuration of an optical coupler 10 is described which is an example of the optical device of the present invention.

FIG. 1 is a perspective view indicating the configuration of the optical coupler. FIG. 2 is a plan view of the optical coupler as viewed from the upper side of the main surface of its clad layer.

This optical coupler 10 comprises a waveguide path (i.e., core layer) 12 for propagation of an optical signal, a clad layer 14 for confining this optical signal into the waveguide path 12, and a substrate 16. Although the substrate 16 may be thought of to be part of the clad layer from the viewpoint of its function to confine the optical signal into the waveguide path 12, the substrate 16 is discriminated from the clad layer 14 in this embodiment. In FIGS. 1 and 2, to spotlight the outline of the waveguide path 12, its boundary lines are expressed in a solid line on a main surface 14A of the clad layer 14.

In this configuration example, the waveguide path 12 comprises an input waveguide path 18 (18A and 18B), an input-side field distribution connection waveguide path 20 (20A–20D), a multi-mode waveguide path 22, an output-side field distribution connection waveguide path 24 (24A–24F), and an output waveguide path 26 (26A–26C). The specific configuration of these waveguide paths is described later. Furthermore, this optical coupler 10 comprises input ports P1 and P2 for inputting an optical signal and output ports P3, P4 and P5 for outputting the optical signal. The input ports P1 and P2 are connected to the ends of the input waveguide paths 18A and 18B respectively and present in a region of the same first end surface S1 in the optical coupler 10. The output ports P3, P4, and P5 are connected to the ends of the output waveguide paths 26A, 26B, and 26C respectively and in a region of the second end surface S2 facing the first end surface S1. For example, when input to the input port P1, an optical signal propagates through the input waveguide path 18A, the input-side field distribution connection waveguide path 20A, a multi-mode waveguide 22, the output-side field distribution connection waveguide path 24A (or 24B, 24C, 24D, 24E, or 24F), and the output waveguide path 26A (or 26B or 26C), thus being output from the output port P3 (or P4 or P5).

Next, the process is described for manufacturing this optical coupler 10.

In this configuration example, a ridge type manufacturing method is described. First, as the above-mentioned substrate 16, a rectangular substrate is used which has an electro-optic effect. This substrate 16 is made of, for example, an organic material, a ferroelectric, glass, InP, $LiNbO_3$, etc. On the main surface 16A of this substrate 16 is formed a core layer (e.g., non-doped InGaAsP, or organic material, ferroelectric, glass, $LiNbO_3$ with higher index) by the CVD (Chemical Vapor Deposition) method or the epitaxial growth method. Next, the photolithography method, for example, is used to form a resist pattern having the same pattern as the waveguide path 12, on the main surface of the core layer, which pattern is then used to process the core layer. With this, a core for the waveguide path 12 is formed. Next, on the core (waveguide path 12) and the main surface 16A is formed a film of the clad layer 14 (made of the same material as that of the substrate 16) to a same height as measured from the level of the main surface 16A using the CVD method or the epitaxial growth method, thus completing the optical coupler 10.

Next, a specific configuration of this optical coupler 10 is described.

Figure 8:
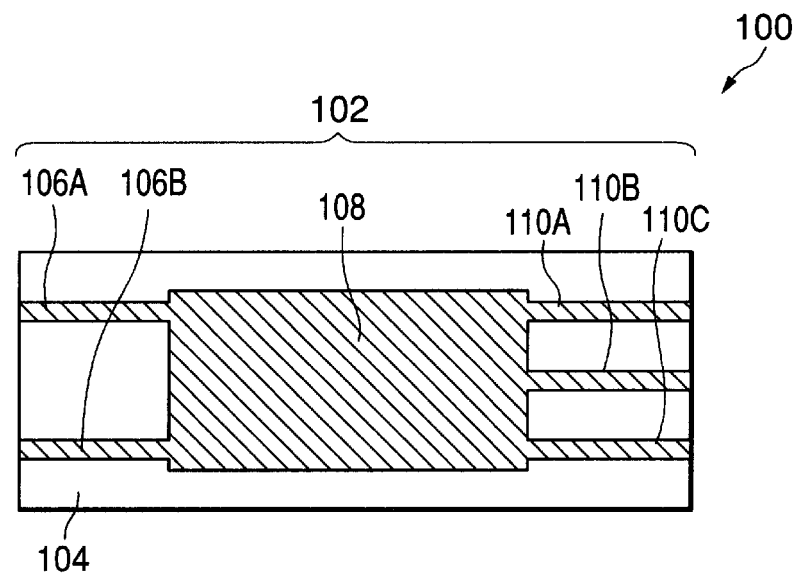
FIG. 8 is a plan view of the first prior-art optical coupler.
Figure 9:
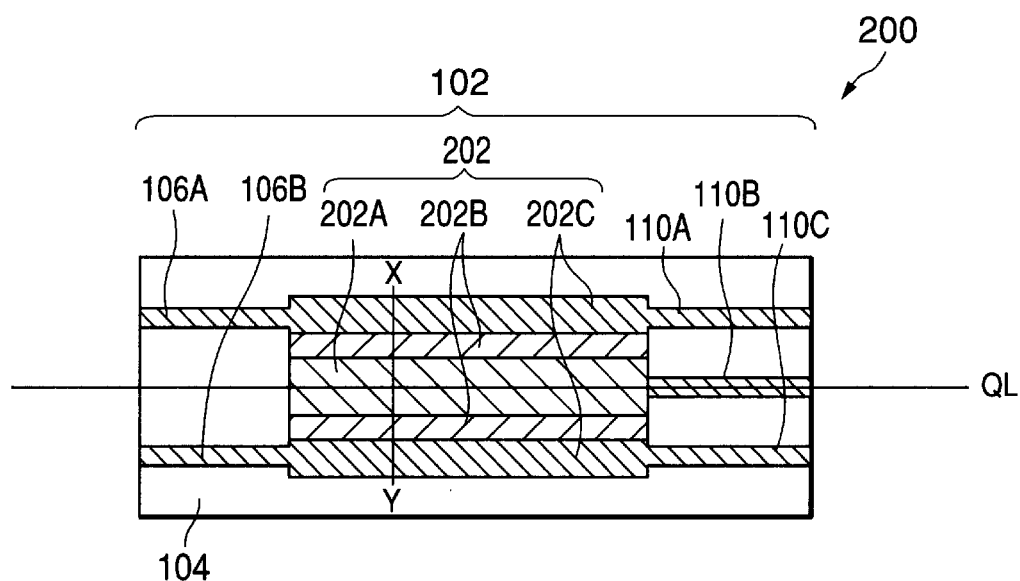
FIG. 9 is a plan view of the second prior-art optical coupler.

The multi-mode waveguide path 22 is a feature of the present invention. This multi-mode waveguide path 22 is formed in an island shape at the middle of the main surface 16A of the substrate 16. The "island shape" means that the core (i.e., waveguide path) along which an optical signal propagates is locally non-continuous in a direction in which this optical signal propagates (hereinafter called propagation direction OD) agrees with the directions of the major axes of the substrate 16 and the multi-mode waveguide path 22. In this configuration example, the multi-mode waveguide path 22 is comprised of a plurality of waveguide paths (sections) (called convex-type waveguide paths (sections)) having a convex-lens cross sectional shape projected onto the main surface 14A as viewed from the upper side of the main surface 14A of the clad layer 14, which plurality of convex-lens type waveguide paths (sections) are arranged parallel to each other along the propagation direction. Moreover, these convex-lens type waveguide paths (sections) each have the same shape and size. The shape of these paths is a both-side convex lens. The centerline QL (i.e., optical axis) interconnecting the centers QO of these convex-lens type waveguide paths parallel to the propagation direction OD and a diameter DL of the each of the multi-mode waveguide paths 22 runs perpendicular to the propagation direction OD. Note here that in this example the mutually adjacent convex-lens type waveguide paths are supposed to be in contact with each other (or may not be). The multi-mode waveguide path 22 displaces the conventional configuration type of the multi-mode waveguide path 108 (FIG. 8) or 202 (FIG. 9.).

Furthermore, in close contact with the vicinity of the opposite sides of the multi-mode waveguide path 22 (convex-lens type waveguide path) nearest to the side of the first end surface S1, the input-side field distribution connection waveguide paths 20B and 20D are arranged respectively. In addition, adjacent to these input-side field distribution connection waveguide paths 20B and 20D are arranged in parallel the input-side field distribution connection waveguide paths 20A and 20C respectively. The input-side field distribution connection waveguide paths 20A–20D have a same shape. The input-side field distribution connection waveguide path pairs of 20A and 20B as well as 20C and 20D are conventionally known as a waveguide path for each pair expanding the optical field distribution of an optical signal input from the input waveguide paths 18A and 18B, thereby conveniently propagating this optical signal in the multi-mode waveguide path 22. In this example, the input-side field distribution connection waveguide paths 20A–20D are each supposed to be a single-mode waveguide path.

Furthermore, in close contact with the vicinity (side of the second end surface) of the opposite sides of the multi-mode waveguide path 22 (convex-lens type wave-guide path) nearest to the second end surface S2 are arranged the output-side field distribution connection waveguide paths 24A, 24C, and 24E respectively. Moreover, adjacent to these output-side field distribution connection waveguide paths 24A, 24C, and 24E are arranged in parallel to each other the output-side field distribution connection waveguide paths 24B, 24D, and 24F respectively. The output-side field distribution connection waveguide paths 24A–24F have the same shape as the input-side field distribution connection waveguide paths 20A–20D. The pairs of the output-side field distribution connection waveguide paths 24A and 24B, 24C and 24D, and 24E and 24F are conventionally known as a waveguide path, for conveniently propagating the optical field distribution of an optical signal input from the multi-mode waveguide path 22 in the output waveguide paths 26A, 26B, and 26C respectively. In this example, the output-side field distribution connection waveguide paths 24A–24F are supposed to be each a single-mode waveguide path.

Furthermore, adjacent to the sides of the first end surface S1 of the input-side field distribution connection waveguide paths 20A and 20C are arranged the input waveguide paths 18A and 18B respectively. The input waveguide paths 18A and 18B are parallel to each other along the propagation direction OD. In this example, the input waveguide paths 18A and 18B are supposed to be each a single-mode waveguide path. Moreover, the width of the input waveguide paths 18A and 18B is made a little smaller than that of the input-side field distribution connection waveguide paths 20A–20D.

Furthermore, adjacent to the side of the second end surface S2 of the output-side field distribution connection waveguide paths 24B, 24D, and 24F are arranged the output waveguide paths 26A, 26B, and 26C respectively. The output waveguide paths 26A, 26B, and 26C are parallel to each other along the propagation direction OD. In this example, the output waveguide paths 26A–26C are supposed to be each a single-mode waveguide path. Moreover, the width of the output waveguide paths 26A–26C is made a little smaller than that of the output-side field distribution connection waveguide paths 24A–24F.

Next, the propagation of an optical signal with the optical coupler 10 is described.

In this example, such a case is described that an optical signal having a predetermined single wavelength is input from the input port P1 to the input waveguide path 18A, that is, the input waveguide path 18B and the input-side field distribution connection waveguide paths 20C and 20D are not employed. The optical signal propagates, in the single mode, through the input waveguide path 18A and the input-side field distribution connection waveguide paths 20A and 20B in this order. Then, the optical signal enters the multi-mode waveguide path 22 (convex-lens type waveguide path). This optical signal propagates in the multi-mode waveguide path 22 in the multi-mode. Then, the optical signal is output from the both-side convex-lens type waveguide path 22 to each of the output-side field distribution connection waveguide paths 24. With the optical field distribution of the optical signal as output, the power ratio of the is optical signal varies which is supplied to each of the output-side field distribution connection waveguide paths 24. For example, if the optical-field distribution is concentrated to the side of the output-side field distribution connection waveguide path 24A, the optical signal is essentially input, as staying in the single mode, only to the output-side field distribution connection waveguide path 24A and then output via the output-side field distribution connection waveguide path 24B and the output waveguide path 26A from the output port P3. In addition, if, for example, the optical-field distribution is given uniformly over the output-side field distribution connection waveguide paths 24A, 24C, and 24E, the optical signal is essentially equally coupled to the output-side field distribution connection waveguide paths 24A, 24C, and 24E and, as a result, the values of the power of the optical signal output from the output ports P3, P4, and P5 are equal to each other, in which case the optical coupler 10 acts as a star-configuration optical coupler.

Figure 3:
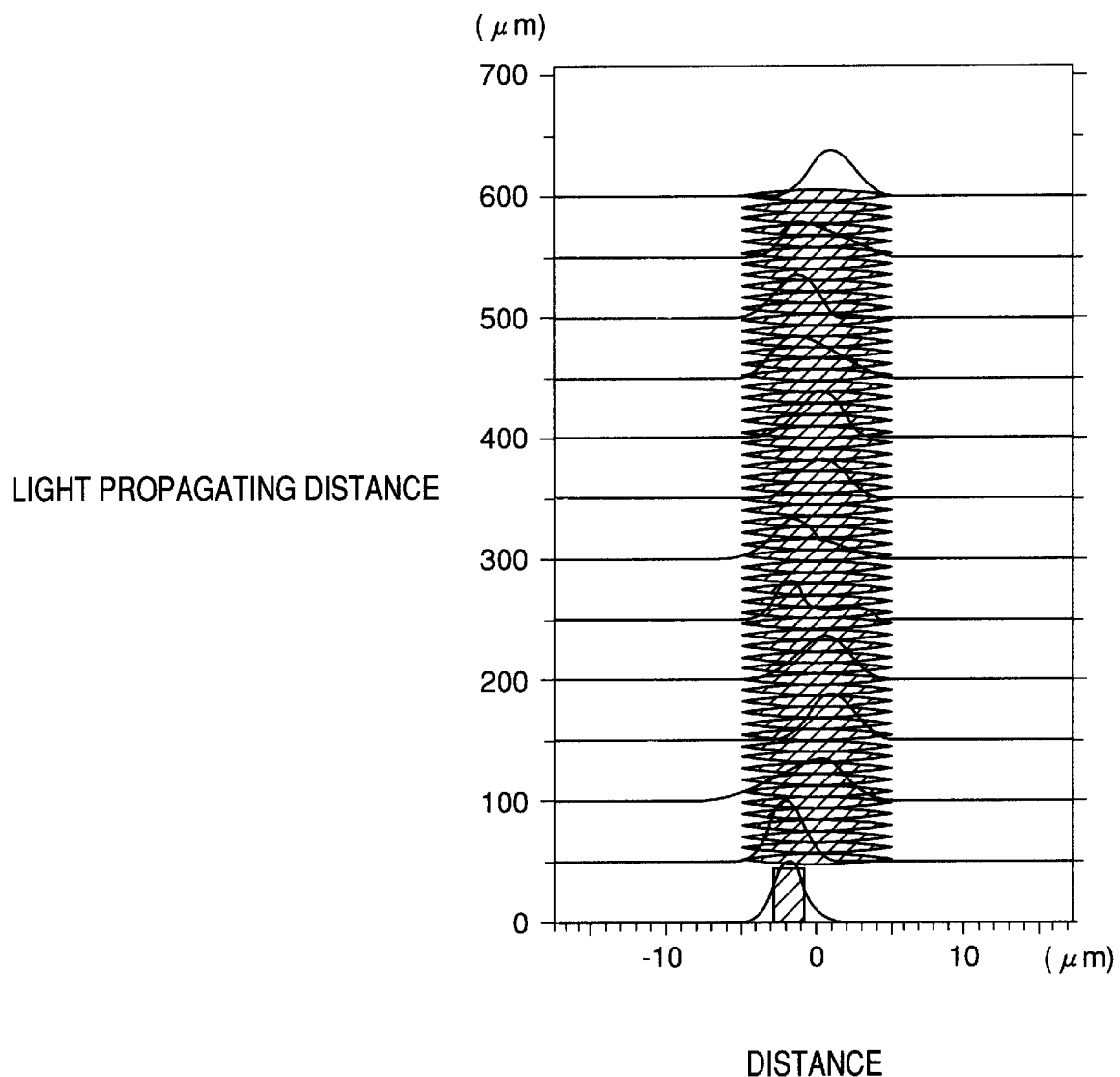
FIG. 3 is a graph indicating results of simulation of the propagation of an optical signal according to the embodiment of the present invention.
Figure 4:
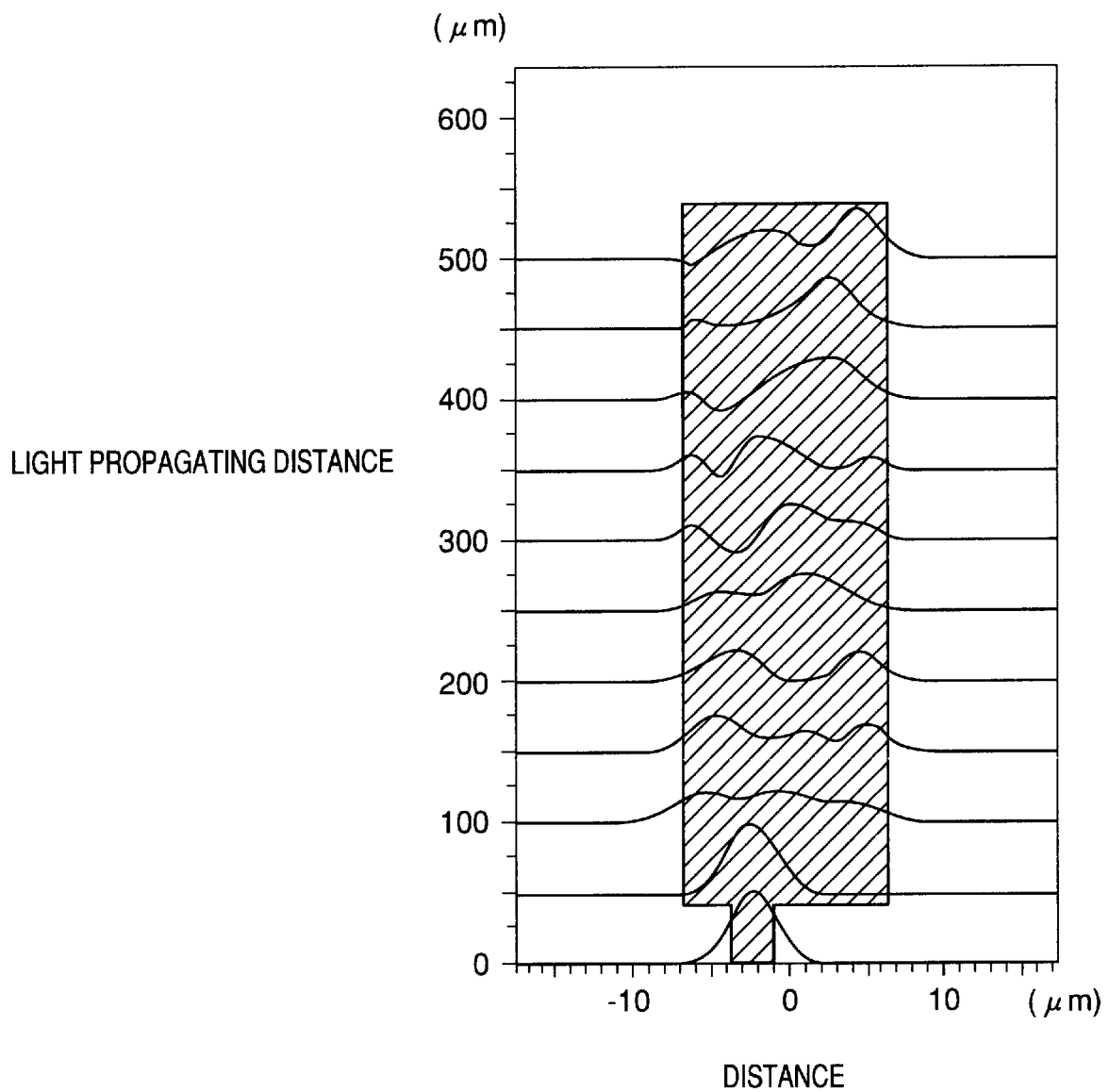
FIG. 4 is a graph indicating results of simulation of the propagation of an optical signal with a first prior-art optical coupler.
Figure 5:
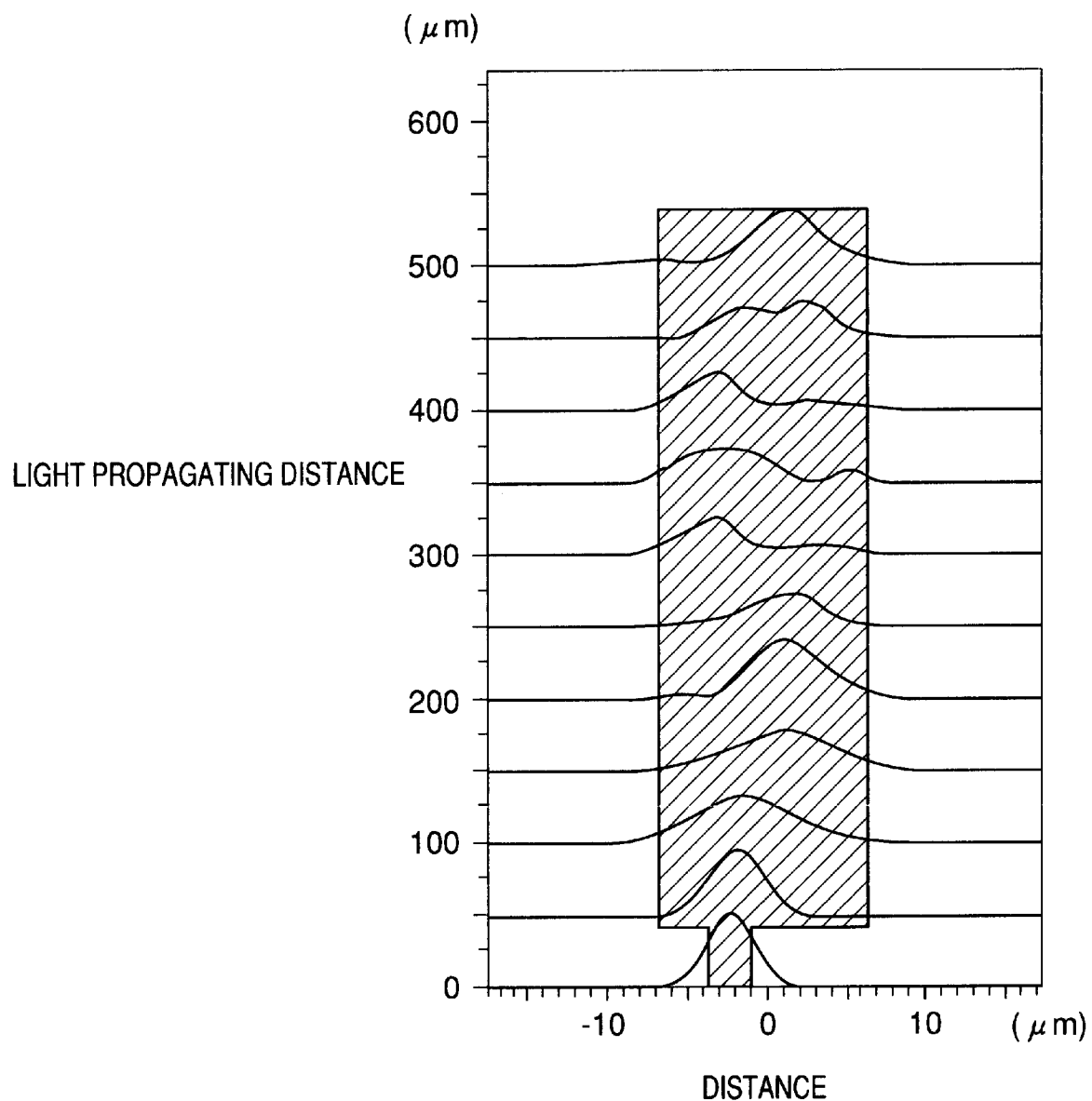
FIG. 5 is a graph indicating results of simulation of the propagation of an optical signal with a second prior-art optical coupler.

Next, the results are described of simulating the propagation form of an optical signal with the optical coupler, with reference to FIGS. 3, 4, and 5.

FIG. 3 is a graph indicating the simulation results for the propagation form of the optical signal with the optical coupler according to the present invention. FIGS. 4 and 5 are graphs indicating the simulation results of the propagation form of an optical signal with the respective first and second optical couplers having a prior-art configuration. Their vertical and horizontal axes represent a distance of a light in its propagation direction (i.e., propagation distance measured in the unit of $\mu$m) and a perpendicular distance measured also in the unit of 82 m. The 0-$\mu$m mark on the horizontal axis is supposed to indicate the major-axial centerline QL of the multi-mode waveguide path. Furthermore, the figures shows a regional portion of one input port and the multi-mode waveguide path (hatched portion).

Figure 10:
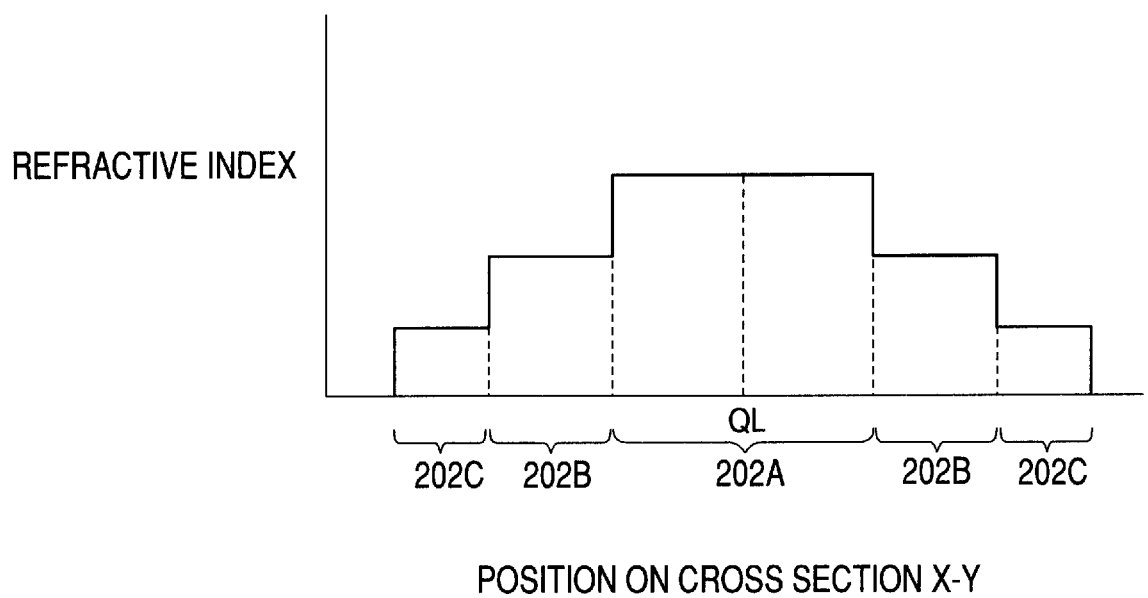
FIG. 10 is a graph indicating the refractive index of a multi-mode waveguide path of the second prior-art optical coupler.

In this example, in either case, the simulation was conducted using the conventionally known BPM (Beam Propagation Method). Moreover, the optical signal input from an input port to the optical coupler is supposed to be a Gaussian beam having a wavelength of 1.55 $\mu$m. In addition, the widths of the input waveguide path, the output waveguide path, and the multi-mode waveguide path are supposed to be 2 $\mu$m, 2 $\mu$m, and 10 $\mu$m respectively (in the case of the optical coupler 10 of the present invention, the width of the multi-mode waveguide path is indicated by the diameter DL in FIG. 1). The substrate is supposed to have a refractive index of 3.40. For the optical coupler 10 and the first optical coupler 100, their core is supposed to have a uniform refractive index value of 3.42. For the second optical coupler 200, on the other hand, the core (waveguide path) is supposed to have a refractive index of 3.42 except for the multi-mode waveguide path 202 and, at the same time, as mentioned above, the refractive index of the multi-mode waveguide path 202 is supposed to be step-wise as shown in FIG. 10, in which simulation, the refractive indexes of the high-refractive index region 202A, the medium-refractive index region 202B, and the low-refractive index region 202C are set at 3.50, 3.45, and 3.42 respectively.

First, comparing FIG. 4 (the first coupler 100 having the conventional configuration) and FIG. 5 (the second coupler 200 having the conventional configuration) to each other shows that the propagation shape of the optical-field distribution of the optical signal is largely different between these two couplers. This is because the first coupler 100 gives a uniform refractive index (3.42) in the multi-mode waveguide path 108, while the second coupler gives a step-wise changing refractive-index distribution in the multi-mode waveguide path 202. As mentioned above, by the configuration of the first coupler 100, it is not always possible to obtain a desired shape of the optical-field distribution in the multi-mode waveguide path 108. Therefore, the ratio of optical coupling to the output ports is limited to a certain range, so that this coupling ratio cannot always be set at a desired value, which leads to a problem. By the configuration of the second coupler 200, on the other hand, the optical-field distribution can be obtained in a desired shape in the multi-mode waveguide path 202, thus setting the coupling ratio at a desired value.

Next, comparing FIG. 3 (the optical coupler 10 of the present invention) and FIG. 5 (the second coupler 200 having the conventional configuration) shows that the optical-field distribution is relatively similar in both couplers. This is considered because there is some similarity between the shape of the refractive-index curve of the multi-mode waveguide path 202 in the second coupler 200 (see FIG. 10) and the shape of the curve of the average of the refractive index (hereinafter simply called average value) along the light propagating direction OD. This average value can be called, in other words, an average of the refractive index over a region between an incident point NT upon the multi-mode waveguide path 22 and an emergent point ST therefrom of the optical signal along the optical path (such as that described above) of the convex-lens type waveguide path (see FIG. 1).

Figure 6:
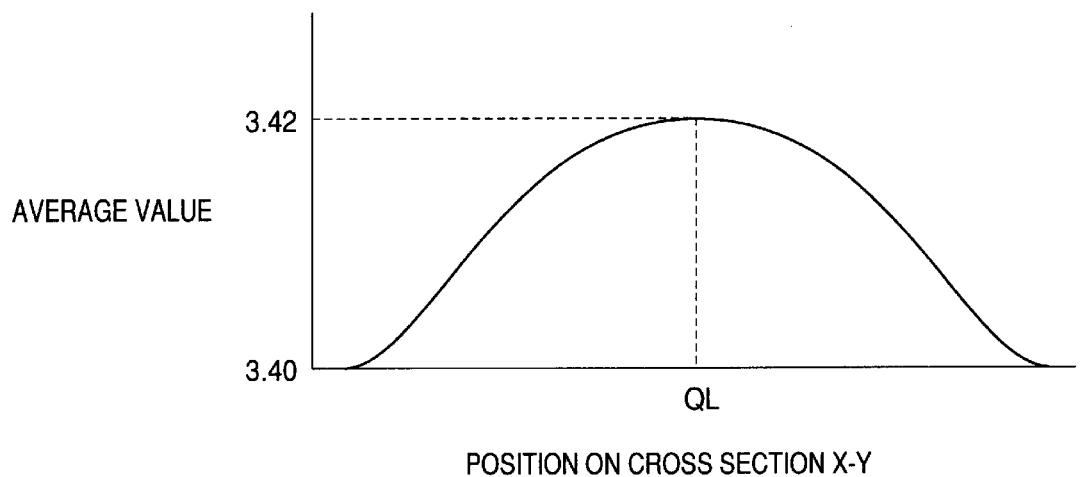
FIG. 6 is a graph indicating an average value of the refractive index.

FIG. 6 is a graph indicating the average value. Its vertical and horizontal axes represent the average value and the position on the cross section X-Y of the multi-mode waveguide path 22 (i.e., in the minor-axial direction of the multi-mode waveguide path 22.

According to this configuration of the optical coupler 10, the average value becomes the maximum (i.e., equal to 3.42, calculated as the core's refractive index) at the centerline interconnecting the centers of the convex-lens type waveguide paths. This average value then decreases axi-symmetrically about the centerline QL as its center axis, equalizing 3.40 calculated as the refractive index of the clad at the end of the multi-mode waveguide path 22. This graph is similar, in shape, to a Gaussian distribution. Therefore, this average-value curve is relatively similar, in shape, to the refractive index curve for the second coupler 200.

With this, when the optical signal has completely propagated through the multi-mode waveguide path 22, the average value of the refractive index of the multi-mode waveguide path 22 propagated by this optical signal in the propagation direction OD is essentially the same as the refractive index of the second coupler propagated by this optical signal in the propagation direction OD. Therefore, macroscopically, it is possible to obtain almost the same optical-field distribution in the multi-mode waveguide path 22 (optical coupler 10) as that in the multiple-mode waveguide 202 (second coupler 200). Therefore, according to the configuration of the optical coupler 10, it is possible to output an optical signal from any given output port like the case according to the configuration of the second coupler 200.

Furthermore, by the configuration of the optical coupler 10, in configuring the multi-mode waveguide path 22, the present optical device can be manufactured much more easily due to the omitted process of impurity diffusion required in the conventional configuration (the multi-mode waveguide path 202 of the second coupler 200). It improves, therefore, the production efficiency of this optical coupler 10.

The present invention is not limited to the above-mentioned embodiment but can be modified in various manners according to a desired design.

For example, the optical signal may be input from the output port side and then output from the input port side.

For example, moreover, the optical device can be manufactured by a conventional burying type manufacturing method publicly known in place of the above-mentioned ridge type one.

For example, furthermore, the distribution of the average value of the refractive index may be a desired one (double-Gaussian or triple-Gaussian distribution) in place of the Gaussian distribution according to the above-mentioned embodiment. The shape of the multi-mode waveguide path 22 may be configured as desired as far as the desired configuration can be obtained. That is, the multi-mode waveguide path 22 should only be formed in an island.

Figure 7:
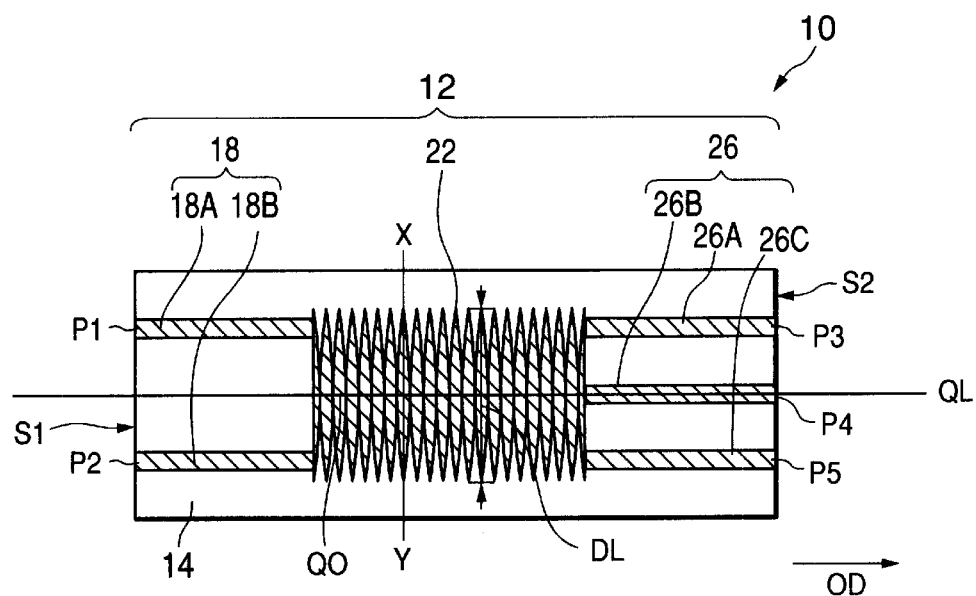
FIG. 7 is a plan view of deformations of the embodiment of the present invention.

For example, furthermore, although the above-mentioned embodiment has used a both-side convex-lens shape of each of the multi-mode waveguide paths 22, a flat convex lens may be employed, as shown in FIG. 7, as the multi-mode waveguide path 22 positioned at the most distant end. FIG. 7 is a plan view of the optical coupler (modification) as viewed from the upper side of the main surface of the clad layer. In this case, it is directly connected to the input and output waveguide paths with the plane portion of the flat convex lens facing the first and second end surfaces S1 and S2.

Furthermore, the clad layer 14, which is made of the same material as the substrate 16 though, may be made of a different material. Further, the clad layer 14 may be air, in which case, the waveguide path 12 is exposed to the air except for the portion attached to the substrate 16.

For example, in addition, any given electrodes may be applied to the clad layer's main surface 14A of the above-mentioned optical coupler 10 and a surface facing this main surface 14A respectively, thus proving an optical switch.

As can be seen from the above description, the optical device of the present invention has its multi-mode waveguide path formed in an island, thus making it possible to obtain a desired coupling ratio. Additionally, because the process of impurity diffusion employed in the conventional configuration is not required by the present invention, this optical device can be more easily manufactured.

What is claimed is:

1. An optical device comprising:
   a substrate;
   a clad layer; and a waveguide path located between said substrate and said clad layer, said waveguide path comprising at least one input waveguide path, a multi-mode waveguide path optically connected to said at least one waveguide path, and a plurality of output waveguide paths optically connected to said multi-mode waveguide path, wherein said multi-mode waveguide path comprises a plurality of waveguide sections each having a convex-lens shape, and said plurality of waveguide sections being arranged parallel to each other along a direction of propagation of light in said waveguide path.

2. An optical device according to claim 1, wherein said waveguide path is adapted to be set to an average refractive index of a desired value along the direction of propagation.

3. An optical device according to claim 1, wherein said plurality of waveguide sections have a same shape and a same size.

4. An optical device according to claim 1, wherein both sides of each of said plurality of waveguide sections have a convex-lens shape.

5. An optical device according to claim 2, wherein said multi-mode waveguide path is adapted to be set to the average refractive index of the desired value along the direction of propagation.

6. An optical device according to claim 1, wherein said plurality of waveguide sections are immobilized between said clad layer and said substrate such that said plurality of waveguide sections are coaxial.

7. An optical device according to claim 1, wherein said waveguide path further comprises at least one input-side field distribution connection waveguide path located between said at least one input waveguide path and said multi-mode waveguide path and a plurality of output-side field distribution connection waveguide paths located between said multi-mode waveguide path and said plurality of output waveguide paths.

8. An optical device according to claim 7, wherein said at least one input-side field distribution connection waveguide path has width greater than that of said at least one input waveguide path and said plurality of output-side field distribution connection waveguide paths have widths greater than that of said plurality of output waveguide paths.

9. An optical device according to claim 1, wherein said at least one input waveguide path and said plurality of output waveguide paths are single-mode waveguide paths.

10. An optical device according to claim 1, wherein said clad layer and said substrate are a same material.

11. An optical device according claim 1, wherein said clad layer is air.

* * * * *